3,049,944
SEMI-AUTOMATIC TWO-SPEED HUB GEARING FOR VELOCIPEDES
Glenn S. Spencer, Horseheads, N.Y., assignor to The Bendix Corporation, a corporation of Delaware
Filed Oct. 5, 1959, Ser. No. 844,591
6 Claims. (Cl. 74—750)

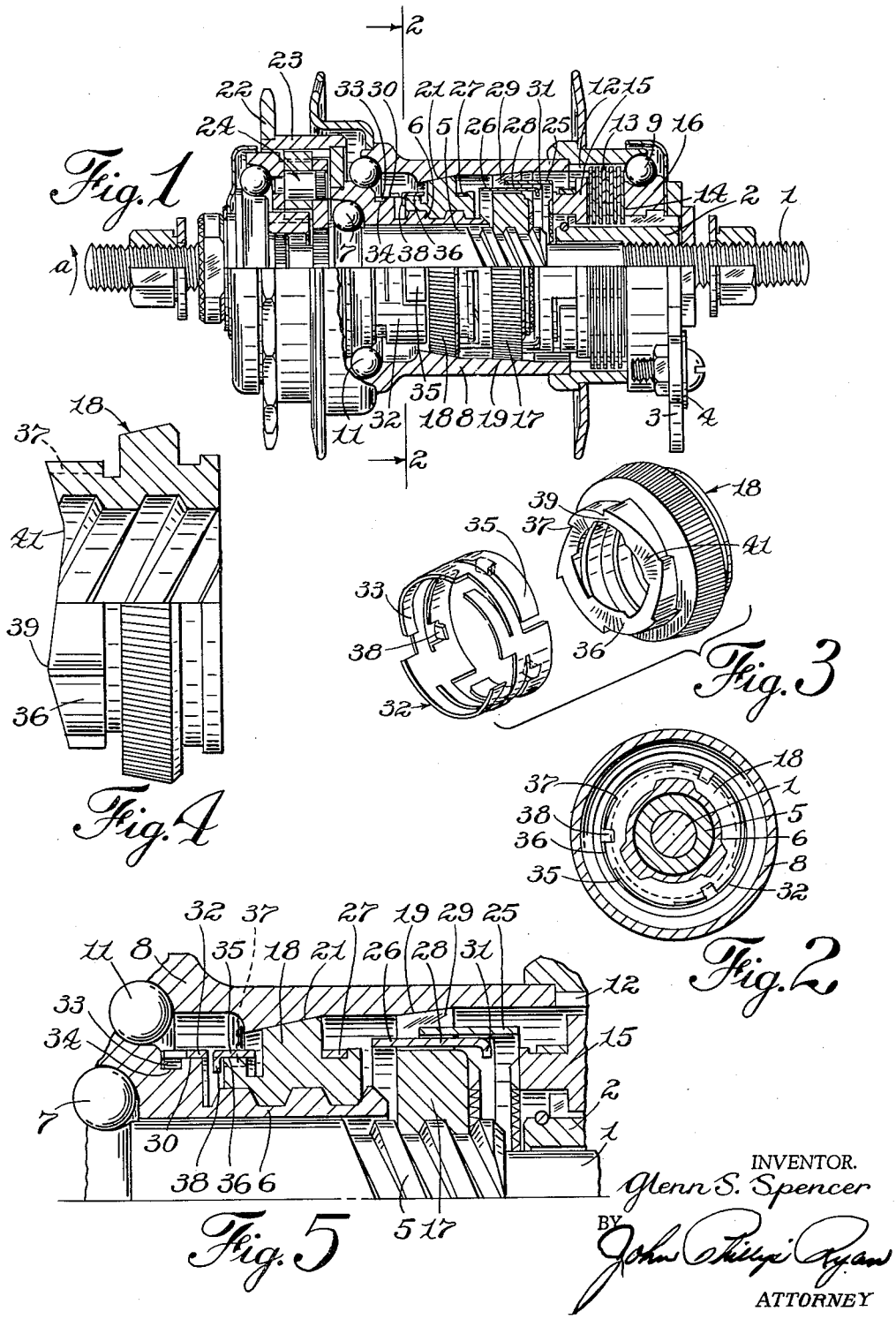

The present invention relates to a semi-automatic two-speed hub gearing for velocipedes and the like and more particularly to that type in which the shift from one gear ratio to the other is accomplished by a slight backward rotation of the propulsion means.

It is an object of the present invention to provide a novel unit of the above type which is efficient and reliable in operation while being simple and economical in construction.

It is another object to provide such a device in which the hub is rotated alternately by means of automatically engaging high speed and low-speed clutch members and means is provided for optionally preventing engagement of the high speed clutch.

It is another object to provide such a device in which the means for controlling the engagement of the high speed clutch member incorporates a blocking or abutment member in the path of movement of the high speed clutch member which is brought into and out of operative position by said backward rotation of the propulsion means.

It is another object to provide such a device in which the high speed clutch member is in the form of a nut threaded on a rotary screw shaft, and the indexing and blocking functions are accomplished by a single element cooperating with said nut and screw shaft.

It is another object to provide such a device in which the relationship of the parts to secure the desired operation is inherent in the construction of the parts so that no predetermined angular relationship of the parts during assembly is required.

Further objects and advantages will be apparent from the following description taken in connection with the accompanying drawing in which:

FIG. 1 is a side elevation, partly broken away and in section, of a preferred embodiment of the invention;

FIG. 2 is a section taken substantially on the plane of line 2—2 of FIG. 1;

FIG. 3 is a detail in perspective of the high speed driving clutch member and the blocking and indexing member shown in disassembled relation.

FIG. 4 is an enlarged detail, partly in axial section and partly in side elevation, of the high speed clutch member;

FIG. 5, is an enlarged detail, partly in axial section, of the hub, the screw shaft and clutch members with their associated parts.

In FIG. 1 of the drawing there is illustrated an axle 1 on which an anchor member 2 is adjustably mounted and prevented from rotation by a torque arm 3 adapted to be connected to the frame of the vehicle by a clip 4 in the usual manner.

A low-speed screw shaft 5 is journalled on the axle 1, and a high speed screw shaft 6 is rotatably mounted on the low speed screw shaft by means of bearings 7. A hub 8 is rotatably mounted on the bearing member 16 secured to the anchor member 2 and on the high speed screw shaft 6 by means of bearings 9 and 11, respectively, and is internally splined as indicated at 12 for the reception of brake discs 13 which are intercalated between brake discs 14 splined on the anchor member 2. A brake ring 15, also splined on the anchor member 2 is arranged to compress the brake discs against a bearing member 16 fixed on said anchor member.

A low speed driving clutch member 17 is threaded on the low-speed screw shaft 5, and a high speed driving clutch member 18 is threaded on the high speed screw shaft 6, the arrangement being such that forward rotation of the screw shafts causes the corresponding clutch members threaded thereon to move into clutching engagement with corresponding formed seats 19, 21 in the interior of the hub 8.

Means for rotating the two screw shafts from a common source of power in the form of a sprocket 22 is provided, comprising an orbit gear 23 fixedly mounted on the high speed screw shaft and planetary reduction gearing indicated generally by the numeral 24 for transmitting the rotation of the orbit gear to the low-speed screw shaft at reduced speed.

In order to ensure traversal of the driving clutch members on their screw shafts responsive to rotation of said shafts, a retarder sleeve 25 is frictionally connected to the non-rotatable brake ring 15 and splined to the low-speed clutch nut 17, and a high speed retarder 26 is splined to the low-speed clutch nut and provided with a frictional connection to the high speed clutch nut by means of a spring arm 27 (FIG. 5) bearing in a groove in the periphery of the high speed clutch nut.

The high speed retarder 26 is provided with arms 28 traversing axial slots 29 in the periphery of the low-speed clutch nut to provide the spline connection, and the arms 28 are also provided with terminal hook portions 31 limiting the separation of the driving clutch members. The hooks 31 also serve to limit the travel of the high speed clutch nut 18 away from its engaging position by abutting against the adjacent surface of the brake ring 15.

Means under the control of the operator for preventing engagement of the high speed driving clutch member with the hub in order to permit the low-speed clutch member to engage and drive the hub is provided in the form of a blocking and indexing sleeve 32 (FIG. 3) which is frictionally swiveled on an enlarged portion 30 of the high speed screw shaft and has a pawl and ratchet connection to the high speed clutch member 18. The swivel connection is provided by a plurality of spring arms 33 bearing frictionally in a groove 34 in the periphery of the high speed screw shaft 6 and the pawl and ratchet connection is provided by pawl arms 35 bearing on a reduced extension 36 of the high speed clutch member 18 which extension is formed with a plurality of ratchet teeth 37 equally spaced about its periphery. The ratchet teeth 37 and pawl arms 35 are so oriented that oscillation of the high speed screw shaft 6, transmitted to the blocking member 32 by the frictional connection 33, 34 causes the blocking member to be indexed in the backward direction in respect to the high speed drive clutch member 18.

The blocking function of the member 32 is accomplished by means of a plurality of equally spaced inwardly directed projections 38, operating in conjunction with an equal number similarly spaced axially projecting connections 39 (FIGS. 3 and 4) formed on the end of the reduced extension 36 of the high speed clutch member 18. The projections 39 on the clutch member 18 are preferably in the form of cams or waves as illustrated. They are equally spaced about the end surface of the clutch member, and such spacing is equal to twice the spaces between the ratchet teeth 37 so that there are twice as many ratchet teeth as there are projections 39 on said member.

It is to be noted that the rearward travel of the high speed clutch member 18 is so limited by engagement of the hooks 31 of the retarder spring 26 with the brake ring 15 that the pawl arms 35 of the blocking member 32 are prevented from losing contact with the extension 36 of the high speed clutch nut.

In operation, starting with the parts in the positions illustrated in FIG. 1, in which the high speed clutch member 18 is in engagement with the hub, forward rotation of the sprocket 22 will be transmitted directly to the high speed screw shaft 6 whereby the high speed clutch member 18 engages and rotates the hub 8 at the same speed.

By reference to FIG. 5, it will be noted that the high speed clutch member 18 is permitted to engage the hub by reason of the fact that the blocking projection 38 of the blocking ring 32 is opposite a space or valley such as indicated at 41 in FIG. 3.

When it is desired to operate in low gear, the operator rotates the sprocket 22 backward slightly in the direction of the arrow (*a*) which is counterclockwise when viewed from the left-hand end of FIGURE 1, thus rotating the high speed screw shaft 6 backward. This backward rotation is transmitted to the blocking ring 32 by the frictional connection 33, 34, but the high speed clutch member 18 does not rotate backward by reason of its frictional connection to the stationary anchor member 2 through the retarder sleeves 26, 25. The pawl arms 35 of the blocking ring 32 are consequently caused to snap over one ratchet tooth 37 on the high speed clutch member 18.

Upon subsequent forward rotation of the sprocket 22 and screw shaft 6, the projections 38 of the blocking sleeve 32 will be alined with a projection 39 of the high speed clutch member 18, whereby the engaging movement of the high speed clutch member will be stopped and said clutch member held spaced from the clutch surface 21 of the hub. The low-speed clutch member 17 is thus permitted to engage the clutch surface 19 and rotate the hub by means of the planetary reduction gearing 24.

It will be appreciated that since the relationship of the ratchet teeth 37 and projections 39 and the coordinating relationship of the pawl arms 35 and projections 38 of the blocking sleeve 32 are fixed and determined by their construction, the advantages of the simplicity of construction are enhanced by the fact that no particular timing or angular relationship between the parts as assembled is necessary. The parts simply go together and operate without having to be oriented in any particular way.

Although but one form of the invention has been shown and described in detail it will be understood that changes may be made in the precise form and arrangement of the parts without departing from the spirit of the invention.

I claim:

1. In a semi-automatic two-speed gear drive for velocipedes and the like a fixed axle, an anchor member non-rotatably mounted thereon, a low-speed screw shaft journalled on the axle, a high speed screw shaft rotatably mounted on the low-speed shaft, means for rotating said shafts at different speeds from a common driving member, a hub rotatably mounted on the anchor member and the high speed screw shaft, a low-speed clutch member threaded on the low-speed screw shaft and formed to engage and rotate the hub responsive to forward rotation of the low-speed screw shaft, a high speed clutch member threaded on the high speed screw shaft and formed to engage and rotate the hub responsive to forward rotation of the high speed screw shaft, and means under the control of the operator for preventing engagement of the high speed clutch member with the hub comprising an abutment member formed with radially biased circumferentially extending spring arms bearing in a circumferential groove in the high speed screw shaft to form a frictional swivel connection therewith and having a pawl and ratchet connection with the high speed clutch member, said abutment member and high speed clutch member having projections engageable to selectively prevent the high speed clutch member from moving into clutching engagement with the hub.

2. A two-speed gear drive as set forth in claim 1 in which the high speed clutch member is formed exteriorly with a plurality of equi-spaced ratchet teeth, and the abutment member is provided with a circumferentially extending spring pawl arm bearing on said teeth to form said pawl and ratchet connection.

3. A two-speed gear drive as set forth in claim 2 including further, means for limiting the travel of the high speed clutch nut away from its hub engaging position, the axial width of said pawl and ratchet teeth being so coordinated with the limited travel of the high speed clutch nut that the pawl bears on the ratchet teeth at all times.

4. A two-speed gear drive as set forth in claim 2 in which the projections and equi-spaced ratchet teeth on the high speed clutch member are arranged in a ratio of one (1) to two (2), respectively, and in which said pawl and ratchet connection is operatively responsive to oscillations of the high speed screw shaft transmitted to the abutment member through said frictional connection.

5. A two-speed gear drive as set forth in claim 1 in which the high speed clutch member is formed with a plurality of laterally extending equidistantly spaced projections, and the abutment member is provided with an inwardly extending projection positoned to be brought into and out of the path of said first mentioned projections by step-by-step relative indexing movement of the abutment member and high speed clutch member by means of said pawl and ratchet connection.

6. A two-speed gear drive as set forth in claim 5 in which the high speed clutch member is formed exteriorly with a plurality of equally spaced ratchet teeth, and the abutment member is provided with a spring pawl arm bearing on said teeth, said high speed clutch member having twice as many ratchet teeth as the number of said lateral projections, said teeth and projections of the high speed clutch member being so related to the pawl and inwardly extending projection of the abutment member that said latter projection lines up alternately with a projection and with a space between the projections of the high speed clutch member as the abutment member and high speed clutch member are relatively indexed step-by-step by the pawl and ratchet.

References Cited in the file of this patent

UNITED STATES PATENTS

| | | |
|---|---|---|
| 2,865,478 | Hood | Dec. 23, 1958 |
| 2,882,754 | Gleasman | Apr. 21, 1959 |
| 2,914,152 | Gleasman | Nov. 24, 1959 |